July 7, 1970 — H. H. SON GULLBERG — 3,519,229
DEICING BOOT AND METHOD OF MAKING THE SAME
Filed Oct. 22, 1968 — 3 Sheets-Sheet 2
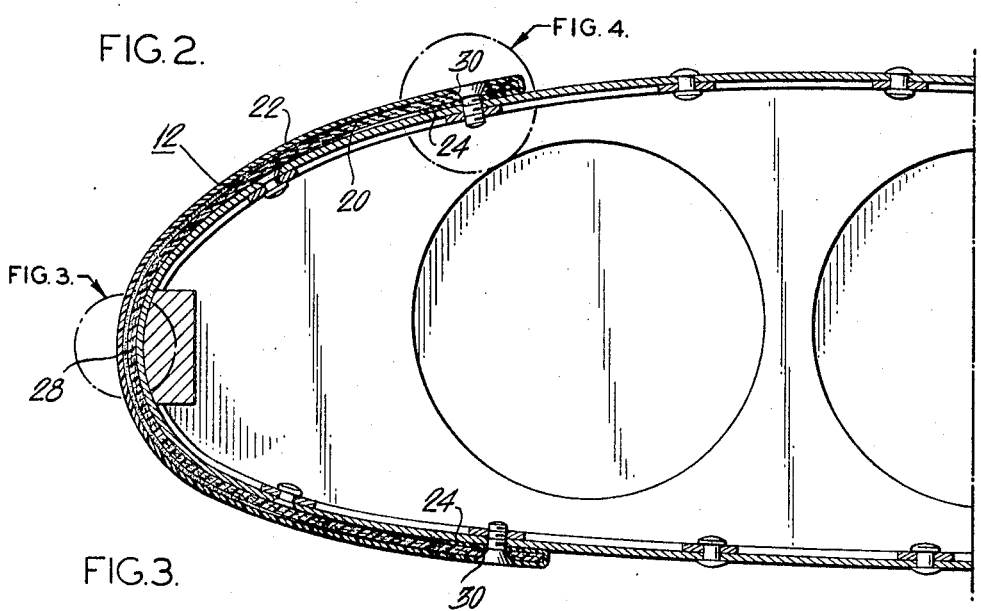
FIG. 2.
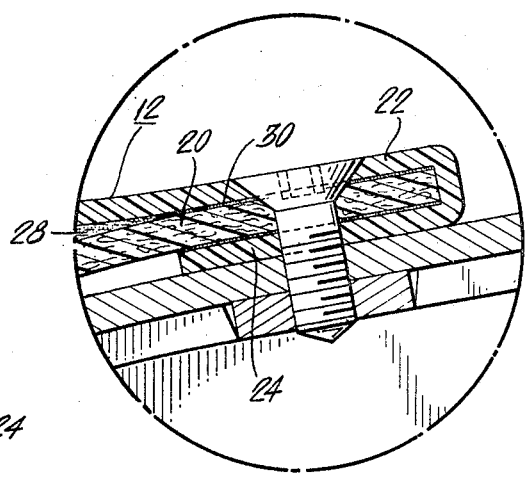
FIG. 3.
FIG. 4.
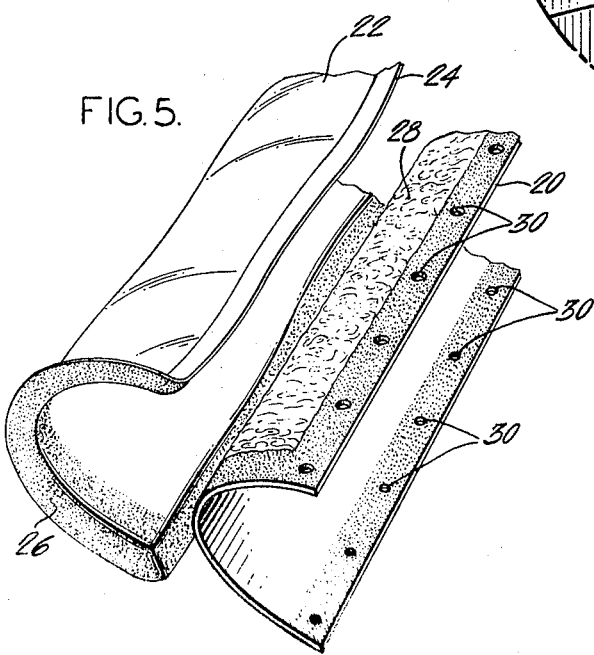
FIG. 5.
INVENTOR:
HERBERT H. SonGULLBERG
BY Howson & Howson
ATTYS.

July 7, 1970  H. H. SON GULLBERG  3,519,229
DEICING BOOT AND METHOD OF MAKING THE SAME
Filed Oct. 22, 1968  3 Sheets-Sheet 3
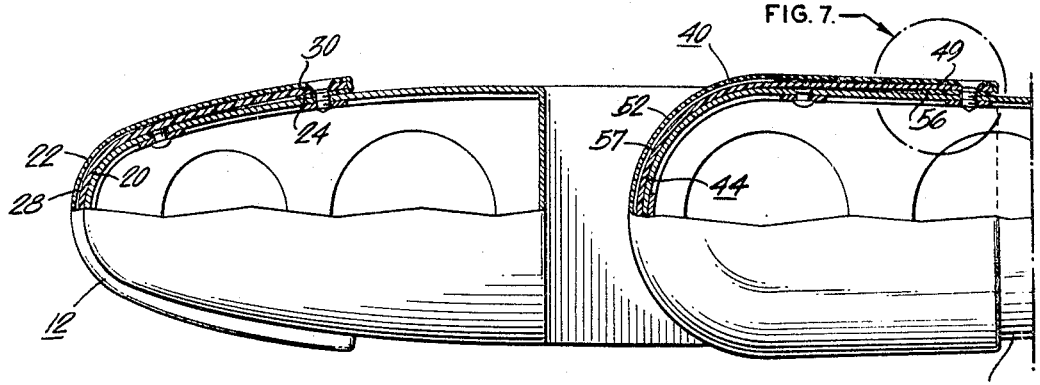
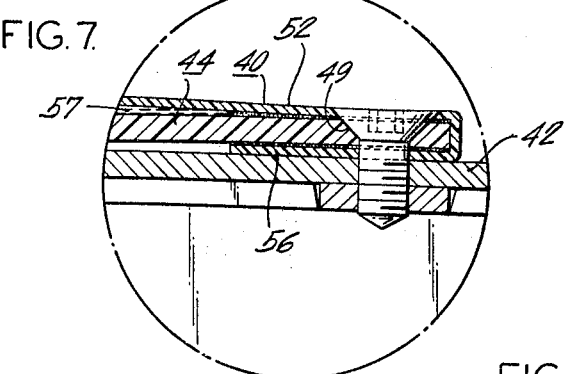
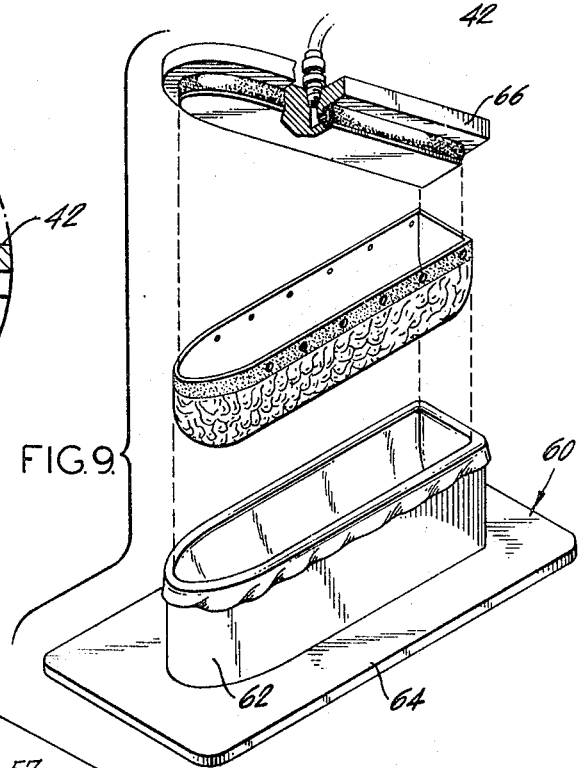
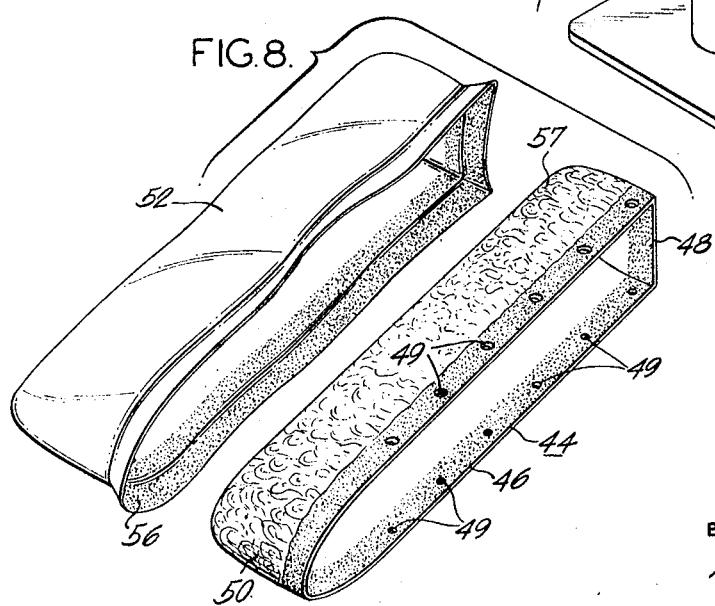
INVENTOR:
HERBERT H. SonGULLBERG
BY
Howson & Howson
ATTYS.

United States Patent Office 3,519,229
Patented July 7, 1970

3,519,229
DEICING BOOT AND METHOD OF MAKING THE SAME
Herbert H. Son Gullberg, Moylan, Pa., assignor to H. H. Son Gullberg, Inc., Moylan, Pa., a corporation of Pennsylvania
Filed Oct. 22, 1968, Ser. No. 769,493
Int. Cl. B64d 15/18
U.S. Cl. 244—134                    6 Claims

ABSTRACT OF THE DISCLOSURE

A deicing boot for preventing accumulation of ice formations on edge portions of vehicles comprising a casing shaped to conform to the surface of the edge portion of the vehicle on which it is adapted to be mounted, a flexible skin adhered to the peripheral edge of the casing under slight tension and a lubricant interposed between the skin and outer surface of the casing.

---

The present invention relates to new and improved means for preventing accumulation of ice on vehicles such as aircraft which travel at a maximum speed of between 350–400 miles per hour.

The present invention is particularly adapted for use in preventing accumulation of ice on the lead edge of air foils. This is a serious problem since ice formation can cause control problems. Various ice prevention means have been attempted which have not been entirely successful. For example, some of these arrangements have consisted of a flexible curtain mounted over the lead edge of an aircraft wing which is adapted to be moved across the lead edge by means of a mechanical actuator means including an actuator motor and a transmission system, including cables connected to the opposite terminal edges of the flexible curtain. By this arrangement, when a layer of ice accumulates on the curtain, the curtain may be actuated across the leading edge of the structure to change the radius of curvature in the area on which the horn of ice accumulates. Thus, the ice, not being sufficiently flexible, cannot take the new shape and tends to loosen and discharge from the wing by the action of the air moving across the wing. Other arrangements have consisted of the use of a flexible skin mounted on the lead edge and a system for inflating the skin relative to the lead edge which, of course, includes piping interiorly of the aircraft wing connected to a suitable source of air pressure under the control of the operator. This system works on substantially the same principle as that discussed above. For example, as ice accumulates on the flexible skin, on being inflated, the skin takes a new shape and the ice does not conform to this new shape and is therefore loosened to be discharged by the wind during movement of the aircraft.

In other cases, ice removal means have been employed on the lead edge of a propeller and have consisted of a flexible skin mounted directly over the lead edge of the propeller and secured at closely spaced intervals by means of an adhesive to the propeller. The principle of operation in these arrangements is the utilization of the centrifugal force on rotation of the propeller to cause movement of the skin relative to the propeller surface. The problem, however, has been that since the skin is secured at closely spaced intervals which is necessary to prevent shedding thereof, there is not enough relative movement to effectively shed the ice formations.

The prior arrangements have several disadvantages and drawbacks which the present invention is designed to overcome. For example, the mechanical systems for actuating the flexible curtain as well as the pressurized air systems add to the expense and weight of the aircraft. Moreover, there is the possibility of the mechanical system malfunctioning by jamming or other causes, and the air system not operating properly whereby the reliability of these systems is not guaranteed. Both systems are also objectionable since they are prone to "freeze up" under certain conditions. Additionally, in the case of the mechanical systems wherein the curtain or skin directly confronts the lead edge surface, there is the danger of formation of air pockets causing "fluttering" which presents control problems. More specifically, air flow over the air foil is adversely affected causing undue stress and vibrational effects on the structural members resulting in altitude and speed control problems and even failure of some parts.

The present invention which is designed to overcome the difficulties and problems of the prior de-icing systems is a de-icing boot adapted to be detachably secured to the lead edge on an air foil or the like. The boot consists of a casing or shoe made, for example, of fiberglass which has an inner surface shaped to conform to the surface on which is adapted to be applied such as the lead edge of a wing or the tail section and a flexible skin drawn tightly over the outer surface of the casing which overlaps the peripheral edge of the casing and is tightly anchored about the entire periphery thereof by means of an adhesive. The boot further includes a lubricant interposed between the skin and outer surface of the casing. If desired a layer of lubricant may be applied to the exterior surface of the skin. By this arrangements as ice forms on the outer skin, the movement and vibrations of, for example the wing, during normal operation of the aircraft, cause the skin to move relative to the casing thereby shaking the ice free. It has been found that in some instances this exterior layer of lubricant enhances ice removal. The lubricant facilitates and insures free movement of the skin relative to the casing. The lubricant also eliminates the possibility of air bubbles between the skin and casing thereby insuring against "fluttering." Since this system does not depend on mechanical or pneumatic actuators, it is completely reliable. Furthermore, since the skin is drawn tightly and adhered about its entire periphery, there is no danger of formation of air pockets between the skin and casing which could adversely affect the control characteristics by changing movement of air over the air foil. Additionally, the boot is easily attached to the air foil lead edge simply by riveting or other screw-type fasteners. By this arrangement, the boot may be easily removed if the aircraft is being used in climates where icing of the leading edge does not present a problem.

These and other objects of the present invention and the various features and details thereof are hereinafter more fully set forth with references to the accompanying drawings, wherein:

FIG. 2 is an enlarged sectional view taken on lines 2—2 of FIG. 1;

FIGS. 3 and 4 are exploded fragmentary views of the areas indicated by broken line circle in FIG. 2;

FIG. 5 is a perspective view of the casing and skin prior to assembly;

FIG. 6 is an enlarged sectional view taken on lines 6—6 of FIG. 1;

FIG. 7 is an exploded view of the portion of FIG. 6, shown in the area surrounded by a broken circle;

FIG. 8 is a perspective view of the casing and skin of a modified boot assembly for use on the stabilizer horn of the tail section; and FIG. 9 is an exploded perspective view of the fixture for assembling elements of the de-icing boot.

Figure 1:
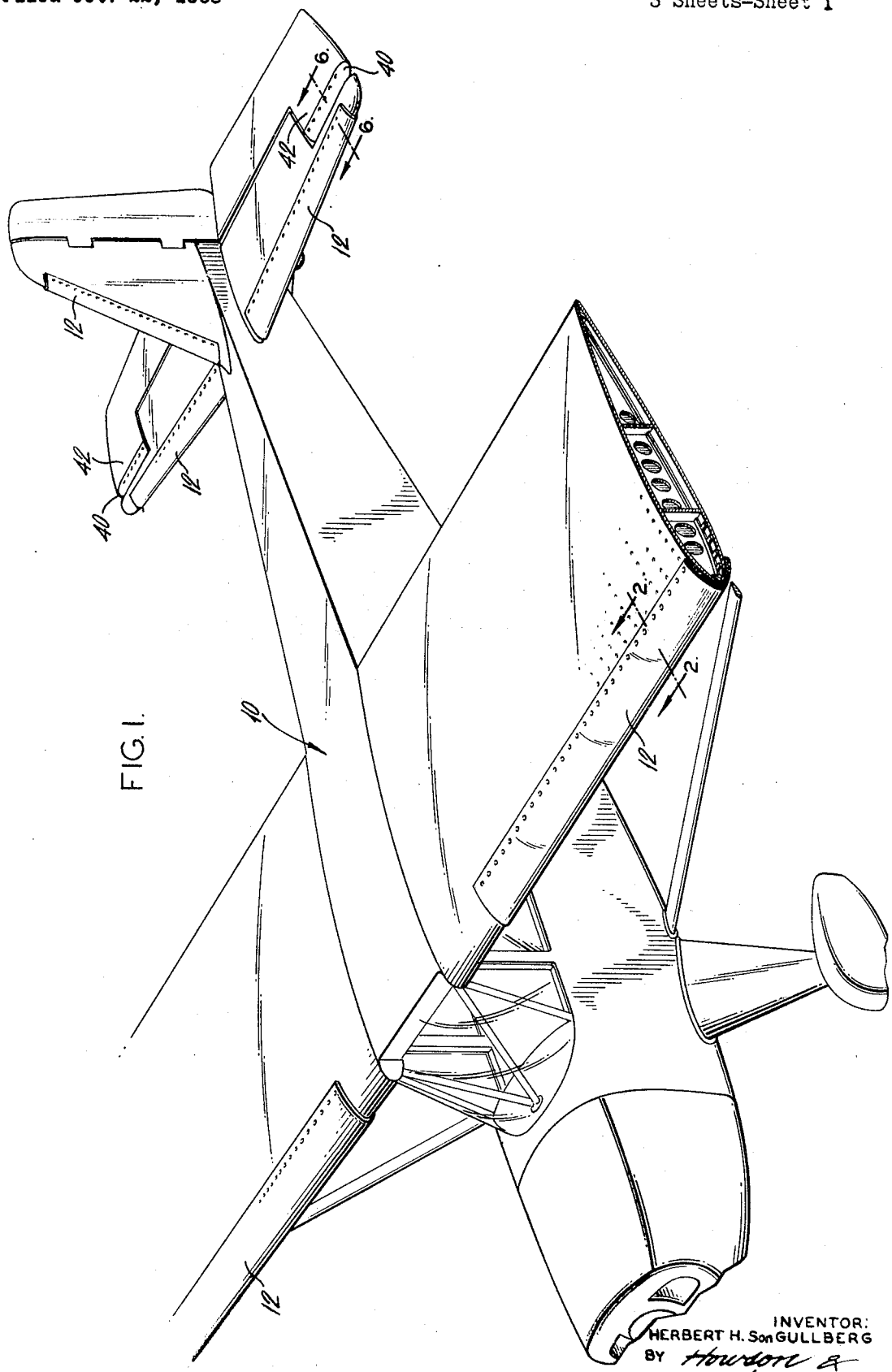
FIG. 1 is a perspective view of an aircraft embodying a de-icing boot constructed in accordance with the present invention.

Referring now to the drawings, and particularly to FIG. 1 thereof, there is illustrated an aircraft generally designated by the numeral 10 incorporating de-icing boots on the various lead edges which are subject to formation of ice thereon. Even though the de-icing boot of the present invention is illustrated and described in connection with aircraft, it is to be understood that the de-icing boot may be applied to other vehicles which are subject to icing and where it is desired to prevent ice accumulation. For example, the de-icing boot may be used on railroad cars which travel at high speeds, parts of radar installations, the superstructure of sea going vessels, particularly submarines, and on automobiles or helicopter bodies.

The de-icing boot 12 for the lead edge of the aircraft and the tail section comprises a casing or shoe 20 which is of generally U-shaped cross section and has a smooth exterior surface and an interior shape to conform closely to the contour or curvature of the lead edge as best illustrated in FIG. 2. The casing 20 is preferably made of an inert material which can be freely formed to the precise shape required. It has been found that fiberglass is a suitable material for the casing 20 because it has good impact strength characteristics even at low temperatures and is lightweight these being important considerations particularly in aircraft. The boot 12 further includes an outer skin 22 made of a flexible material which is of a size to provide longitudinal peripheral edges 24 and end edges 26 which overlap the casing 20 so that it may be secured in overlapping relation to the casing in the manner shown in FIG. 4 by means of a suitable adhesive. The boot assembly further includes a lubricant 28 interposed between the skin 22 and the outer surface of the casing 20 which serves to facilitate movement of the skin relative to the casing and also eliminates formation of air bubbles between the skin and casing thereby preventing "fluttering." As illustrated, the casing 20 is provided with a series of openings 30 along opposed longitudinal side edge portions to facilitate assembly of the boot to the leading edge of the aircraft by means of screw or rivet type fasteners.

The following sets forth the preferred material specifications for the elements of the de-icing boot in accordance with the present invention.

SKIN 22—POLYURETHANE

Flexible—black thermoplastic —85 to 90 dur. on A scale
Tensile p.s.i.—6m.–7m.
Elongation—[1] 500 to 600%
Elongation set—[1] 18–30%
Modulus (# a 300%)—1600–2200 p.s.i.
Tear Die B (#/in.) (nicked)—600–850 p.l.i.
Tear Die C (#/in.)—450–650 p.l.i.

[1] Results to be with and against the grain of material.

LUBRICANT 28

Low—high temperature
Viscous silicon f. ex.
GE Silicone #G660 Lot #233

CASING 20

Fiber glass or other inert materials

The elements of the boat 12 are made and assembled in the following manner. The fiberglass casing 20 is made of a suitable length and curvature for a particular lead edge in conventional molding apparatus. The skin 22 is sized in relation to the casing to provide the side overlaps 24 and the end underlaps 26. The skin 22 is then loosely placed in a fixture conforming generally to the outer contour of the casing 20 and a lubricant applied to the inner surface of the skin.

The casing 20 is then loosely placed in the fixture and an adhesive applied to the outer peripheral edge of the casing 20 and the inner surface of the skin 22 immediately adjacent the side overlaps 24 and underlaps 26. A suitable bonding agent that would gently but firmly shape the skin or film at the fold-over points is applied to the inner surface of the skin 22 as indicated in FIG. 5 and to the inner and outer peripheral side end edges of the casing 20 as also indicated in FIG. 5. The skin 22 is then stretched over the casing and suitable pressure applied at the adhesive areas to securely bond the skin to the casing in the areas indicated. Adhesive is then applied to the inner peripheral edges of the casing 20 and the inside face of the overlaps 24 and underlaps 26. Pressure is applied and maintained for a suitable time for complete bonding. It is noted that the skin is stretched by a suitable means and held in a suitable manner in the stretched condition until the adhesive has cured. It has been found that the skin should be stretched vertically six pounds per horizontal lineal inch and that a suitable cure time for some adhesives is a minimum of 36 hours. This cure time can be reduced by use of a hot air or infrared heat. In some instances the desired pre-stretching of the skin 22 on the casing 20 can be achieved by applying adhesive to inner and outer peripheral edges of the casing, overlapping the skin and applying pressure.

The finished boot 12 is now ready to be assembled to the lead edge of the main wing and the tail section simply by positioning the boot over the lead edge and puncturing the skin at the spaced openings in the casing to permit insertion and assembly of the fasteners, for example pop rivets. It is noted that the puncture openings in the skin may be made substantially smaller than the rivet size and the holes 30 in the casing so that there is a seal of the skin in the opening 30. Additionally the rivet forms a seal when applied, thereby eliminating all possibility of air bubbles between the casing and skin. As is readily apparent, this assembly procedure is relatively simple. Furthermore, as indicated above the entire boot assembly may be removed easily when desired, for example if the aircraft is used in an area where icing does not present a problem and the use of the de-icing boot is not needed.

In operation of the aircraft, the various wing sections move and vibrate during normal operation of the aircraft whereby accumulation of ice on the skin of the boot sheds by reason of the relative movement of the skin over the surface of the casing. In this regard, the lubricant facilitates free limited movement of the skin sufficiently to permit the ice to be shed. The action of the skin relative to the casing is very akin to the movement of skin on the human body relative to the bone structure in the area of the kneecap or knuckles. For example, when pressure is exerted, the pressure point is rolled over the bone so that a given section of the skin is displaced to a different bone curvature structure. Similarly, in movement of the skin 22 relative to the rigid casing 20 a new curvature is presented to the ice which may form on the skin and since the ice is rigid, the base of the ice where it adheres to the skin does not conform to the casing curvature and is thus shed by the movement of air over the wing and tail.

There is illustrated in FIGS. 6–8 inclusive a modified form of the de-icing boot constructed in accordance with the present invention. This boot which is generally designated by the numeral 40 is a complete unit which is adapted to be assembled to the leading edge of the horn balance section 42 of the aircraft.

The de-icing boot 40 comprises a casing or shoe 44 which is preferably made of an inert material suitable for forming to the precise shape required by conventional molding process. In the present instance the casing 44 comprises an elongated body portion 46 of generally U-shaped cross section to conform closely to the contour of the horn balance section 42, a flat end wall 48 closing one end of the body portion and an arcuate end wall 50 at its opposite end. The casing as illustrated includes a plurality of spaced openings 49 facilitating assembly of the boot to the horn balance section by means of conventional fasteners as explained in more detail hereinafter. The boot also includes an outer skin 52 made of a flexible material which, in the present instance is in the form of a bag-like member so dimensioned that it is stretched longitudinally and vertically when it is applied over the casing 44. The inner terminal edge of the skin has a circumferentially extending flap 56 adapted to overlap the inner edge of the casing and be suitably secured thereto by means of an adhesive. As in the previously described embodiment, the boot assembly further includes a lubricant 57 interposed between the skin and outer surface of the casing which permits movement of the skin relative to the casing and also eliminates formation of air bubbles, thereby preventing "fluttering."

The skin is assembled to the casing in much the same manner as described in connection with the previous embodiment. In other words, an adhesive is applied to the casing and skin in the areas indicated; the lubricant is applied to the outer surface of the casing and thereafter the skin is assembled to the casing. Suitable means are provided for holding the skin in a stretched position for a time sufficient to permit curing of the adhesive. The skin is punctured in the area of the openings in the casing to permit the completed boot assembly to be installed by means of suitable fasteners, such as pop rivets. There is illustrated in FIG. 9 a fixture for use in assembling the various elements of the de-icing boot shown in FIG. 8. A fixture which is generally designated by the numeral 60 includes an extending trough 62 having an inner contour to loosely fit the outer contour of the de-icing boot, a press 64 and an expander 66 for applying pressure and maintaining the skin in a pre-stressing condition during assembly. In using the fixture 60, the skin 46 is first placed loosely in the trough 62 with the peripheral flap 56 extending over the top edge thereof. Lubricant is then applied to the interior of the skin 46 and adhesive is applied to the inside peripheral edge adjacent the flap 56. The casing 44 is then positioned interiorly of the skin 46 with the open portion extending slightly above the skin to permit application of the bond of adhesive to the outer upper edge thereof. The casing is then pressed downwardly to stretch the skin 46 a predetermined desired amount and then the expander 66 is inserted to bond the skin and casing. Thereafter adhesive is applied to the flap 56 and inner edge of the casing, the flap 56 turned under and then the expander 66 is again used to apply pressure during the curing period.

While particular embodiments of the present invention have been illustrated and described herein, it is not intended to limit the invention and changes and modifications may be made therein.

I claim:

1. A deicing boot for preventing accumulation of ice formations on edge portions of vehicles comprising a casing shaped to conform to the surface of the edge portion of the vehicles on which it is adapted to be mounted, a flexible skin overlying the exterior surface of said casing, a lubricant interposed between said skin and the outer surface of said casing, fastening means for securing said boot to the edge portion of the vehicles, said skin having a flap portion extending about its entire periphery which overlaps the casing and snugly engages between the inner surface of said casing and the outer surface of the vehicles, said fastening means including a plurality of fasteners and a plurality of holes for the fastener along an edge of the casing and means defining a plurality of puncture openings in said skin smaller than the holes in said casing to provide a tight sealing relation with the fastener when the boot is assembled, thereby to preclude ingress of air to the area between the skin and the casing.

2. A deicing boot as claimed in claim 1 including adhesive means for securing the skin to the inner and outer surfaces of said casing adjacent the peripheral edge thereof.

3. A deicing boot as claimed in claim 1 wherein the boot is of a configuration for the horn balance section of an air foil, said casing consisting of an elongated U-shaped body portion, a flat end wall closing one end of the body portion and an arcuate end wall at its opposite end, and said skin is of a bag-like configuration of a predetermined size so that it is stretched longitudinally and vertically when applied over the casing.

4. A deicing boot as claimed in claim 1 wherein the casing is made of fiberglass.

5. A deicing boot as claimed in claim 1 wherein the skin is made of a flexible thermoplastic material.

6. A method of making a deicing boot for assembly to the edge portion of a vehicle consisting of the steps of forming a casing so that the inner surface conforms to the edge portion of the vehicle, applying a lubricant to the outer surface of the casing, applying a skin of flexible material over the casing, adhering the skin to the casing adajcent the entire periphery of the casing, from a plurality of holes of a size to accommodate fasteners along an edge of the casing and providing a plurality of punctured openings in said skin smaller than the holes in said casing to provide a tight sealing relation with the fasteners when the boot is assembled to the edge portion of a vehicle, thereby to preclude ingress of air to the area between the skin and the casing.

References Cited
UNITED STATES PATENTS

| | | | |
|---|---|---|---|
| 2,385,662 | 9/1945 | Vonnegnt | 244—134 |
| 2,585,285 | 2/1952 | Tonge et al. | 244—134 X |

MILTON BUCHLER, Primary Examiner

J. E. PITTENGER, Assistant Examiner